3,333,967
METHOD FOR STORING FRUIT
Stanley P. Burg, Miami, Fla., assignor to United Fruit Company, Boston, Mass., a corporation of New Jersey
Filed Sept. 26, 1963, Ser. No. 311,828
2 Claims. (Cl. 99—154)

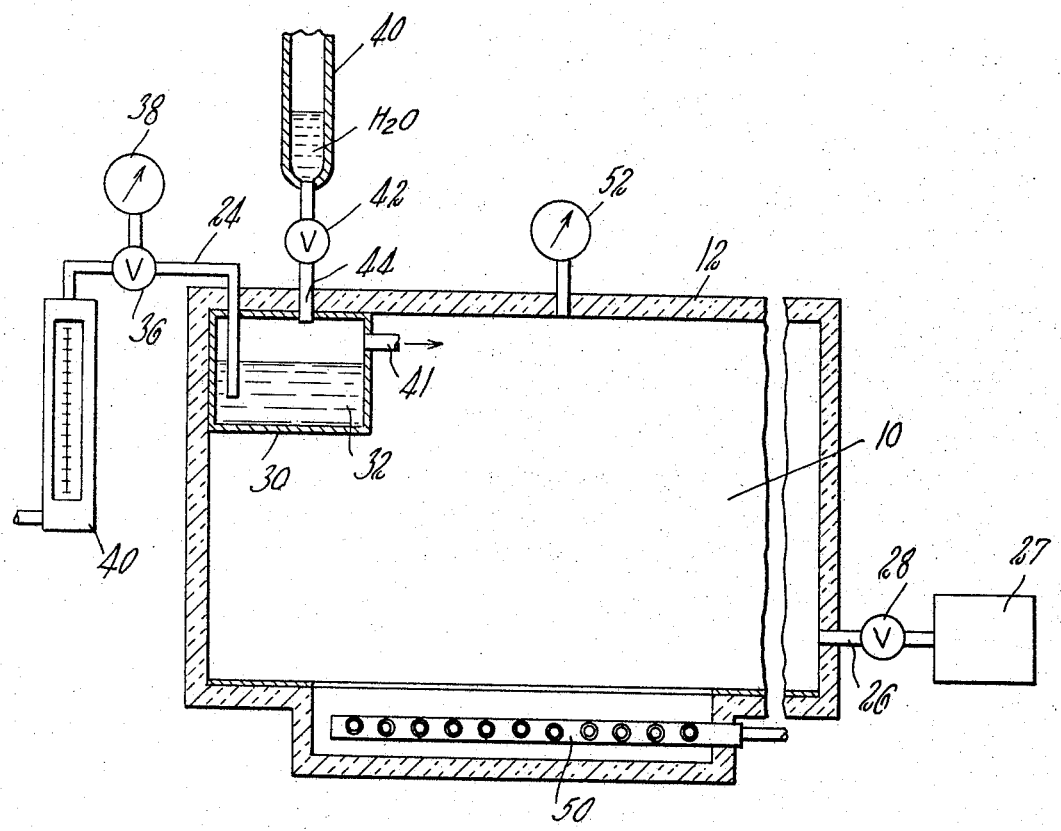

This invention relates to retarding the ripening of edible picked fruits, such as bananas, tomatoes, apples, pears, cherries, limes and other citrus fruits, and to apparatus useful in storing such fruits in a manner to retard their ripening without adverse effects.

As is well known, distances and time involved in transportation of tropical fruit produce renders it necessary to pick the fruit in unripe condition with the hope that the ripening process can be controlled until the fruit is ready for display or delivery at the consumer point of acceptance. Heretofore, aeration or refrigeration has been relied on almost exclusively in the attempt to control the ripening process in the transportation and marketing of fresh bananas. Such procedures often do not delay the ripening long enough—resulting in loss of merchantable fruit, especially when unforeseen transportation delays are encountered.

It is an object of this invention to improve methods for controlling fresh fruit ripening and, in particular, to deal more effectively with the concentration build-up within the fruit of volatile products—specifically ethylene in the case of bananas—which are in part at least responsible for the ripening process—so that the ripening is retarded for longer periods than heretofore thought possible. This is done in accordance with the method of this invention by storing the bananas in a moving gaseous stream, as of air, at subatmospheric pressures, with the result that the moving gaseous stream tends to flush away undesirable gases generated during storage after their more ready release under the conditions of reduced pressure. Undue increase in their concentration within the fruit is thus prevented. However, such storage without more tends to desiccate and shrink the fruit and render it unfit for normal ripening when removed from storage conditions.

Accordingly, in addition to maintaining the bananas in the moving gaseous stream at subatmospheric pressure, such harmful desiccation is avoided by saturating the moving gaseous stream with water at the subatmospheric pressure with the result that ripening has been retarded for periods as long as 50 to 60 days under storage conditions without encountering harmful desiccation, thus permitting normal ripening to resume when the fruit is removed from the controlled storage conditions.

A further object of the invention is to provide apparatus suitable for carrying out the methods of this invention. Such apparatus is diagrammatically shown in the accompanying drawing wherein 10 represents a suitable storage chamber which is formed by a conventional insulated housing 12 (broken away to indicate extent) adapted to be vacuumized, and having an inlet conduit 24 and an outlet conduit 26. The outlet 26 is connected with a suitable vented oil seal vacuum pump 27 through a needle valve 28.

The inlet 24 communicates with chamber 10 through a vessel 30 within the housing 12 which contains a body of water 32 into which inlet pipe 24 extends. Conduit 24 leads from a vacuum valve 36 having an attached vacuum gauge 38 and from a flow meter 40, the inlet to which is open to the atmosphere. Vessel 30 communicates with chamber 10 through a pipe or aperture 41.

Also indicated in the drawing is a water reservoir 40 with a valve 42 and sealed inlet 44 into the vessel 30.

With this apparatus, when the vacuum pump exhausts the chamber 10 to a reduced pressure for which the vacuum valve 36 is set, the vacuum valve will thereafter open slightly to permit flow of air through the system at the set pressure. The air bubbles up through the body of water 32 at the subatmospheric pressure and thereby becomes saturated with water at the subatmospheric pressure before passing through pipe 41 into the storage chamber 10 where the bananas or other fruit are stored.

The rate of flow of air through the chamber 10 is read from the flowmeter 40.

A suitable pressure for example for bananas is about 150 mm. Hg, as shown on the vacuum gauge, and in practice a suitable rate of air flow may be about one fruit chamber volume of air per hour, although the rate of air flow is not critical within wide margins.

While the apparatus may be operated at room temperatures, even better results are obtained if the chamber is cooled to for example 15° C., as by a refrigerator system indicated by coils 50. The temperature of the body of water 32 is thus maintained substantially as low as that of the chamber 10 in order to prevent excess condensation of water in the chamber 10. 52 indicates a temperature gauge to control the temperature in the chamber 10.

At pressures of about 150 mm. Hg and a temperature of 15° C. bananas can be kept for a period of in excess of two months and upon removal from the chamber will continue to further ripen in a normal manner. In general, the ripening period, compared to that taking place with control bananas ripening at atmospheric pressure and under normal humidity conditions, is easily doubled or tripled, the length of successful storage in the apparatus of this invention being governed more by the development of fungal infection than by any over-ripening. Thus, for example, in one instance the original mature green banana control sample commenced to turn yellow after 14 days, while comparative samples stored in the chamber of the apparatus under 150 mm. Hg and at 15° C. with slow air flow were still completely green when removed after 24 days.

In the case of green tomatoes utilizing 130 mm. Hg pressure at 16° C. there was no ripe fruit in 40 days as compared with a control where 100% were ripe in 27 days. Samples of tomatoes removed after 40 days, and thereafter stored at 24° C. in air, ripened well within a week with excellent taste. In the case of tomatoes and fruits other than bananas, storage at even lower temperatures, for example 6° C., should permit the storage of the fruit for a period exceeding two months. For bananas, temperatures lower than about 15° C. unfortunately tend to discolor the peel.

Similarly in the case of avocados, at 150 mm. Hg pressure, 15° C., ripening was definitely perceptible in the control after 6 days as compared with 12 days for the samples stored in the apparatus in accordance with this invention.

Similar results were secured with Florida sweet cherries and guavas picked green. Green limes remained green for 80 days as against a control where 98% of the control samples ripened in 28 days.

As previously stated, the desired results are explainable on the ground that reduced pressure in the range of 100–400 mm. enhances the rate of diffusion of ethylene from the fruit while the moving stream flushes the ethylene away from the fruit surfaces. Respiration and ripening of the fruit appears also to be retarded due to the reduced oxygen tension.

The apparatus can be incorporated into, or installed on the chassis of mobile units, such as trucks, railroad cars, or in ships' holds, as well as in warehouses. Normally the fruit will be boxed and stored in chamber 10 in boxes so that large quantities can be stored without crushing damage to the bottom layers of fruit.

What is claimed is:

1. The method of preserving mature, but less than fully ripe, fruit comprising enhancing the rate of diffusion of ethylene from the fruit by storing the fruit at a sub-atmospheric pressure in the range of 100–400 mm. Hg in a continuously moving stream of water saturated air having a normal 21% $O_2$ content, said stream continuously flushing ethylene, as it is diffused, away from the vicinity of the fruit.

2. The method as claimed in claim 1 wherein the fruit is maintained at a temperature of about 15° C.

References Cited

UNITED STATES PATENTS 2,923,629    2/1960    Bonomi _____ 99—154 X

A. LOUIS MONACELL, *Primary Examiner.*

M. VOET, *Assistant Examiner.*